United States Patent [19]
Yeager et al.

[11] Patent Number: 6,063,875
[45] Date of Patent: May 16, 2000

[54] CARBOXY-FUNCTIONALIZED POLYPHENYLENE ETHERS AND BLENDS CONTAINING THEM

[75] Inventors: Gary William Yeager, Niskayuna; Yiqun Pan, Clifton Park, both of N.Y.

[73] Assignee: General Electric Company, Schenectady, N.Y.

[21] Appl. No.: 09/096,149

[22] Filed: Jun. 11, 1998

[51] Int. Cl.⁷ .................................................. C08G 65/48
[52] U.S. Cl. ........................... 525/397; 528/206; 528/218
[58] Field of Search ................................. 528/206, 218; 525/397

[56] References Cited

U.S. PATENT DOCUMENTS

| | | |
|---|---|---|
| 3,367,978 | 2/1968 | White . |
| 4,234,706 | 11/1980 | White . |
| 4,859,739 | 8/1989 | Yates, III ................................. 525/92 |
| 5,213,886 | 5/1993 | Chao et al. . |
| 5,880,221 | 3/1999 | Liska ....................................... 525/397 |

FOREIGN PATENT DOCUMENTS

| | | |
|---|---|---|
| 0 315 822 A1 | 5/1989 | European Pat. Off. . |
| 05059270 | 3/1993 | Japan . |
| 05059272 | 3/1993 | Japan . |
| 1237385 | 10/1968 | United Kingdom . |
| WO 98/36015 | 8/1998 | WIPO . |

OTHER PUBLICATIONS

"The Synthesis of 4–Hydroxyarylene Ethers by the Equilibration of Phenols with Poly(2,6Dimethyl–1,4–Phenylene Ether)", by White, J. Org. Chem., 34, 297–303 (19690.

*Primary Examiner*—Patricia A. Short
*Attorney, Agent, or Firm*—S. Bruce Brown; Noreen C. Johnson

[57] ABSTRACT

Carboxy-functionalized polyphenylene ethers containing structural units with a carboxyalkyl group in the 2-position are prepared by redistribution of a polyphenylene ether with a 2-carboxyalkylphenol such as 2-(3-carboxypropyl)phenol (melilotic acid), or by oxidative coupling of a suitable phenol with such a 2-carboxyalkylphenol. The products form compatibilizing copolymers with polymers containing carboxylic acid-reactive functional groups, such as polyesters, polyamides and epoxy resins.

2 Claims, No Drawings

CARBOXY-FUNCTIONALIZED POLYPHENYLENE ETHERS AND BLENDS CONTAINING THEM

BACKGROUND OF THE INVENTION

This invention relates to polyphenylene ethers, and more particularly to functionalized polyphenylene ethers useful for the compatibilization of copolymer blends.

Polyphenylene ethers are a widely used class of thermoplastic engineering resins characterized by excellent properties including hydrolytic stability, dimensional stability, toughness, heat resistance and dielectric properties. It is of continuing interest to introduce these desirable properties into polymer blends by incorporating the polyphenylene ethers as blend constituents. This is often difficult, however, since the polyphenylene ethers are incompatible with many other polymers.

A strategy frequently used to compatibilize polyphenylene ethers with other polymers is to introduce into the polyphenylene ether functional groups which are reactive with said other polymers, enabling the formation of copolymer-containing compositions in which the copolymers serve as compatibilizers. For example, polyphenylene ethers containing carboxylic acid functional groups or derivatives thereof can form copolymers with such other polymers as polyamides, hydroxy-terminated polyesters and epoxy group-containing polymers.

Carboxy or carboxy-derived groups (e.g., anhydride groups) have been introduced into polyphenylene ethers by reaction through the hydroxy end groups with such compounds as trimellitic anhydride acid chloride, by grafting reactions with such compounds as maleic anhydride or fumaric acid, and by redistribution with acidic compounds such as p-hydroxyphenylacetic acid. Redistribution reactions are often of particular interest since they may be conducted under relatively mild conditions, typically including temperatures not substantially greater than 100° C. and the presence of non-destructive catalysts such as diaryl peroxides and quinones and relatively inert solvents such as toluene. The redistribution reaction results in a breakup of polymer molecules into lower molecular weight molecules containing the desired carboxylic acid or other functional groups.

Redistribution with the aforementioned acidic compounds is somewhat difficult, however, since said compounds are not adequately soluble in solvents such as toluene. Moreover, the mechanism of the redistribution reaction is such that only low levels of such compounds can be incorporated in the polyphenylene ether, owing in part to substitution in the para position which makes that position unavailable for reaction.

U.S. Pat. No. 5,880,221 discloses attempts at redistribution of polyphenylene ethers with various aryl-substituted alkanoic acids. It was found that whereas carboxy phenols bearing two phenolic hydroxyl groups and alkyl substituents ortho to the phenolic hydroxy groups, such as 4,4-bis(3,5-dimethyl-4-hydroxyphenyl)pentanoic acid, did incorporate, simple phenols such as p-hydroxyphenyloctanoic acid did not. Interest continues, therefore, in the development of improved functionalization strategies employing other carboxylic acids, especially those of simpler molecular structure than the aforementioned bisphenolic acid.

Japanese Kokai 5/59,270 and 5/59,272 disclose reaction products of epoxy- and carboxy-functionalized olefin polymers with copolyphenylene ethers in which a portion of the structural units contain a —(CH$_2$)$_3$OH group. Said copolyphenylene ethers are produced by copolymerization via oxidative coupling of two phenols, one containing and one not containing said group. There is no disclosure of a copolyphenylene ether containing a carboxyalkyl group.

SUMMARY OF THE INVENTION

The present invention is based on the discovery that certain o-hydroxyaromatic-substituted aliphatic carboxylic acids are capable of incorporation under mild conditions into polyphenylene ethers, either by copolymerization or by redistribution. The conditions employed include use of a single solvent in which the polyphenylene ether has high solubility.

One aspect of the invention, therefore, is carboxy-functionalized polyphenylene ethers comprising structural units of the formulas

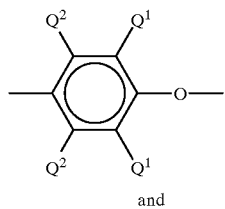

and

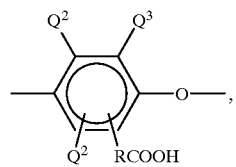

wherein each Q$^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; each Q$^2$ and Q$^3$ is independently hydrogen, halogen, primary or secondary lower alkyl, phenyl, haloalkyl, hydrocarbonoxy or halohydrocarbonoxy as defined for Q$^1$; and R is an alkylene radical containing at least 1 carbon atom.

A further aspect of the invention is a method for preparation of such functionalized polyphenylene ethers which comprises redistributing a polyphenylene ether with a 2-carboxyalkylphenol of appropriate formula (corresponding to formula II) in the presence of a redistribution catalyst.

Another aspect of the invention is a method for production of such functionalized polyphenylene ethers which comprises oxidatively coupling at least one monohydroxyaromatic compound with said 2-carboxyalkylphenol.

These carboxy-functionalized polyphenylene ethers are reactive and readily form copolymers with other reactive polymers. Therefore, a still further aspect of the invention is resinous compositions comprising copolymers of said functionalized polyphenylene ethers with at least one polymer containing carboxylic acid-reactive functional groups.

DETAILED DESCRIPTION; PREFERRED EMBODIMENTS

The polyphenylene ethers which are functionalized according to the invention are known polymers having structural units of formula I. Both homopolymer and copolymer polyphenylene ethers are included. The preferred homopolymers are those containing 2,6-dimethyl-1,4-phenylene ether units. Suitable copolymers include random copolymers containing such units in combination with (for example) 2,3,6-trimethyl-1,4-phenylene ether units. Also included are polyphenylene ethers containing moieties prepared by grafting onto the polyphenylene ether in known manner such materials as vinyl monomers or polymers such as polystyrenes and elastomers, as well as coupled polyphenylene ethers in which coupling agents such as low molecular weight polycarbonates, quinones, heterocycles and formals undergo reaction in known manner with the hydroxy groups of two polyphenylene ether chains to produce a higher molecular weight polymer, provided a substantial proportion of free OH groups remains.

The polyphenylene ethers generally have an intrinsic viscosity greater than about 0.25, most often in the range of about 0.25–0.6 and especially 0.4–0.6 dl./g., as measured in chloroform at 25° C.

The polyphenylene ethers are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful polyphenylene ethers for many purposes are those which comprise molecules having at least one aminoalkyl-containing end group. The aminoalkyl radical is covalently bound to a carbon atom located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups and/or biphenyl structural units, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the polyphenylene ethers contemplated for use in the present invention include all those presently known, irrespective of variations in structural units or ancillary chemical features.

The functionalized polyphenylene ethers of the invention contain, in addition to structural units of formula I, those of formula II in which $Q^{1-3}$ are as previously defined. The units of formula II are characterized by a carboxyalkyl group in the 2- or 3-position, preferably the 2-position, relative to the oxygen atom and a $Q^2$ moiety in the other of the 2- and 3-positions. The R radical in said carboxyalkyl group is an alkylene radical containing at least 1 and preferably 2–6 carbon atoms; it may be linear or branched and is usually linear. Particularly preferred is the ethylene radical, whereupon the corresponding carboxylic acid is 2-(3-carboxypropyl)phenol (melilotic acid).

The first method of the invention for preparation of the functionalized polyphenylene ethers is by redistribution of a conventional polyphenylene ether with the appropriate 2-carboxyalkylphenol; i.e., the compound corresponding to formula II (hereinafter sometimes simply "acid" for brevity). Redistribution may be effected as described, for example, in U.S. Pat. Nos. 3,367,978, 4,234,706 and 5,213, 886 and in White et al. *J. Org. Chem.*, 34, 297–303 (1969), the disclosures of which are incorporated by reference herein.

The redistribution reaction typically involves heating the polyphenylene ether in solution in a relatively inert solvent, most often an aromatic hydrocarbon such as toluene or xylene, with the acid and a redistribution catalyst at a temperature in the range of about 50–110° C. Suitable redistribution catalysts include peroxides such as benzoyl peroxide, cumyl peroxide, t-butylperbenzoic and t-butylalkanoic acids and quinones such as 3,3',5,5'-tetramethyl-4,4'-diphenoquinone (TMDQ).

Redistribution is accompanied by cleavage of the polymer molecule by the acid, which is incorporated in the cleaved molecules, most often as an end group at the head of the molecule. The proportion of acid is determined by the degree of functionalization desired coupled with the overall molecular weight desired in the product; high proportions of acid result in a high degree of functionalization and a lower average polymer molecular weight, while low proportions afford a higher molecular weight polymer with a low degree of functionalization. In general, acid levels are in the range of about 1–10% and preferably about 2–5% by weight based on polyphenylene ether. The promoter is most often employed in the amount of about 1–10% by weight based on polyphenylene ether.

The second preparative method of the invention is copolymerization of the acid in suitable proportions with at least one monohydroxyaromatic compound, i.e., the one corresponding to formula I, in an oxidative coupling reaction. The conditions of said reaction are the art-recognized ones, typically including the presence of a catalyst of oxidative coupling as previously described. An advantage of this method of preparation may be the ease of preparing functionalized polyphenylene ethers of relatively high molecular weights.

The resinous compositions of the invention may be prepared by effecting reaction between the carboxy-functionalized polyphenylene ether and any polymer containing one or more functional groups which are reactive with carboxylic acids. Illustrative groups of this type are hydroxy, amino and epoxy groups. Said polymer may be thermoplastic or thermosetting. Examples of suitable polymers are hydroxy-terminated polyesters, amine-terminated polyamides, and epoxy resins including glycidyl ethers of bisphenols, epoxy-functionalized olefin polymers, epoxy novolaks and alicyclic epoxy resins.

The reaction of the polymer with the carboxy-functionalized polyphenylene ether may take place under any suitable conditions, including solution and melt reaction conditions. Where appropriate, they may be conducted in the presence of suitable catalysts, as illustrated by phase transfer catalysts and epoxy cure catalysts. Other materials, both reactive and non-reactive, may be present. Illustrative materials are impact modifiers, hardeners, fillers, pigments and stabilizers.

The invention is illustrated by the following examples. All parts and percentages are by weight. Molecular weights are weight average unless otherwise indicated and were determined by gel permeation chromatography. Inherent viscosities were determined in chloroform at 25° C. Carboxy incorporation was determined by proton nuclear magnetic resonance spectroscopy.

EXAMPLES 1–4

Samples (20 g each) of a poly(2,6-dimethyl-1,4-phenylene ether) having a weight average molecular weight of about 50, 100 and an inherent viscosity of 0.40 dl/g and 800 mg of melilotic acid were dissolved in 100 ml of toluene. Various amounts of benzoyl peroxide were added and the mixtures were heated at 90° C. for 90 minutes. They were then cooled and the functionalized polyphenylene ethers were precipitated by addition of methanol, filtered and dried overnight in vacuum. The results are given in Table I.

TABLE I

| Example | 1 | 2 | 3 | 4 |
|---|---|---|---|---|
| Benzoyl peroxide, g | 0.40 | 0.80 | 1.20 | 1.60 |
| Product Mw | 18,900 | 16,000 | 13,700 | 12,200 |
| Product Mn | 6,400 | 5,400 | 3,300 | 3,000 |
| Carboxy content, μmol/g | 106 | 123 | 140 | 146 |
| Carboxy incorporation, % | 44 | 51 | 58 | 61 |

EXAMPLES 5–7

The procedure of Examples 1–4 was repeated, substituting TMDQ for the benzoyl peroxide. The results are given in Table II.

TABLE II

| Example | 5 | 6 | 7 |
|---|---|---|---|
| TMDQ, g | 0.20 | 1.20 | 1.60 |
| Product Mw | 16,100 | 11,600 | 11,700 |
| Product Mn | 4,300 | 3,500 | 3,300 |
| Carboxy content, μmol/g | 117 | 161 | 154 |
| Carboxy incorporation, % | 49 | 67 | 64 |

EXAMPLE 8

A 50% solids solution in toluene was prepared from 31 parts of the carboxy-functionalized polyphenylene ether of Example 2, 37.8 parts of a tetrabromobisphenol A diglycidyl ether sold by Dow Chemical under the product designation "DER 542", 17.6 parts of a copolymer of bisphenol A and tetrabromobisphenol A diglycidyl ether, 17.6 parts of an epoxy novolak sold by Ciba Geigy under the product designation "EPN 1138", 3.64 parts of zinc octanoate, 0.33 part of 2-ethyl-4-methylimidazole and 0.84 part of diaminodiethyltoluene. A 7628 E-style glass fiber fabric was impregnated with the solution and the impregnated fabric was heated at 150° C. for 7 minutes to remove solvent and partially cure the epoxy resins. Six plies of the resulting reinforced prepreg were layered and heated in a compression mold at 200° C. for 3 hours. The product was a laminate having the following properties:

Resin content—27.08%;
Solvent resistance (methylene chloride)—good;
Tg—190° C.;
Dielectric constant—4.7;
Dissipation factor—0.0061;
Flammability (UL-94)—V-0.

What is claimed is:

1. A carboxy-functionalized polyphenylene ether comprising structural units of the formulas

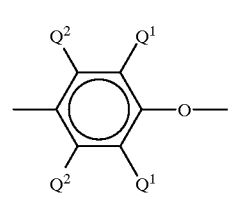

(I)

and

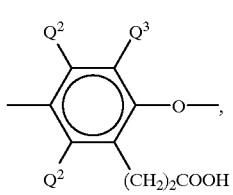

(III)

wherein each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; each $Q^2$ and $Q^3$ is independently hydrogen, halogen, primary or secondary lower alkyl, phenyl, haloalkyl, hydrocarbonoxy or halohydrocarbonoxy as defined for $Q^1$.

2. A carboxy-functionalized polyphenylene ether comprising structural units of the formulas

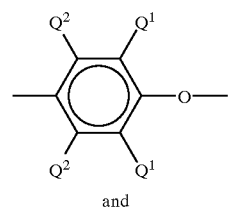

(I)

and

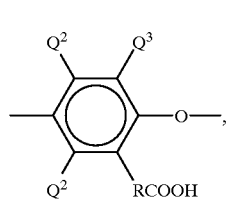

(IV)

wherein each $Q^1$ is methyl; each $Q^2$ and $Q^3$ is hydrogen; and R is ethylene.

* * * * *